March 29, 1927.
L. BONSIEUR
1,622,990
RETAINING DEVICE FOR RODS AND SHAFTS
Filed March 8, 1926
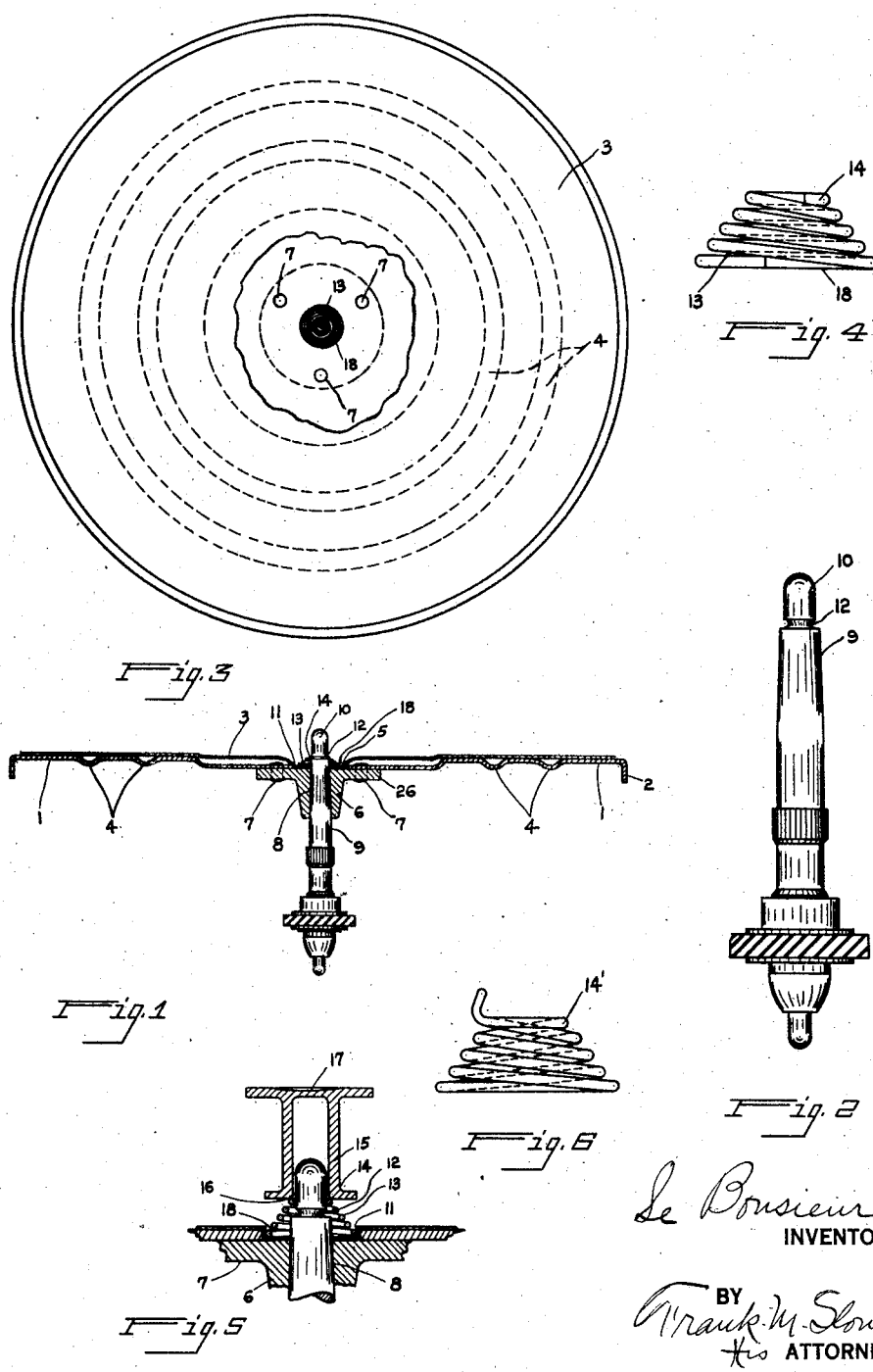

Patented Mar. 29, 1927.

1,622,990

UNITED STATES PATENT OFFICE.

LE BONSIEUR, OF ELYRIA, OHIO, ASSIGNOR TO THE GENERAL INDUSTRIES COMPANY, OF ELYRIA, OHIO, A CORPORATION OF OHIO.

RETAINING DEVICE FOR RODS AND SHAFTS.

Application filed March 8, 1926. Serial No. 93,130.

My invention relates to retaining devices for rods and shafts and relates particularly to retaining devices adapted to retain a part to be secured upon a rod, such as a wheel upon an axle, a phonograph turntable, upon a turntable driving shaft, and the like.

My invention has a particular application in connection with the so-called "portable" type of phonographs but is not limited thereto, and it may be applied to a wide variety of mechanisms and any type of phonograph of the gramophone type. In the case of gramophones, it may be advantageously employed when shipping phonographs with their turntables secured in place.

An object of my invention is to accomplish the ready securing of a part adapted to be carried on or to be carried by a rod or shaft in a simple and efficacious manner.

Another object of my invention is to accomplish the simple and efficacious securing of a wheel or like part, having a tapered opening therethrough, upon a tapered shaft.

Another object of my invention is to accomplish the securing of a wheel, turntable, or the like, upon a rod or shaft, wherein the retaining device may resiliently hold the wheel or turntable in place upon the shaft.

Another object of my invention is to accomplish the securing of a wheel, turntable, or the like, upon a tapered shaft by the addition of only a third single part which may be compressed to be very thin in lateral dimensions when in place upon the rod or shaft.

Other objects of my invention and the invention itself will become apparent by reference to the following description of a phonograph mechanism embodying my invention, and in which description reference will be had to the accompanying drawings illustrating such an embodiment, and which drawings form a part of this specification.

Referring to the drawings, Fig. 1 shows a vertical section of a phonograph mechanism embodying my invention, the view being taken on a diameter of the phonograph turntable, showing the turntable in place on its driving shaft;

Fig. 2 shows an elevational view of the turntable driving shaft;

Fig. 3 shows a plan view of the turntable and associated parts illustrated in Fig. 1, a portion of the felt being shown as broken away;

Fig. 4 shows a spiral spring employed in my improved mechanism before application thereto;

Fig. 5 shows the spiral spring of Fig. 4 being applied to secure a turntable, fragmentarily shown, onto an end of a turntable supporting a driving shaft; and Fig. 6 shows a modified form of spring.

Referring now to all of the figures of drawing, in all of which like parts are designated by like reference characters, at 1, I show a planular phonograph turntable disk having a peripheral downwardly turned flange 2 and to the upper surface of which is affixed a centrally perforated felt pad 3, by cementing the same to the upper surface of the turntable. Turntables of this type are often concentrically ribbed, as indicated at 4, and centrally perforated, as shown at 5, being riveted adjacent such perforation to a flanged hub 6, such as by rivets 7 passing through the disk and the flanges 26 of the hub. The hub has an axially disposed tapered bore 8 of smallest diameter at its upper end for the reception of the end of the turntable driving shaft 9 correspondingly tapered, so that the hub 6 may be placed over the shaft 9 with the end 10 of the shaft preferably projecting slightly above the surface of the turntable and the inner walls of the tapered bore of the hub snugly engaging the cooperating tapered walls of the shaft to make a clutching contact therewith, so that the shaft 9 upon being rotated will drive the turntable. In the embodiment of my invention illustrated, I depress the central portion 11 of the turntable disk so as to provide a slightly recessed central portion about the shaft 10, which projects therethrough.

At 12, I show a peripheral groove for the shaft 9 disposed slightly above the surface of the bottom wall of the recess 11 but preferably disposed just below the surface of the felt pad 3 carried by the turntable. To such a grooved tapered shaft as that shown at 9, and after the turntable 1 has been placed on the shaft, I apply the spiral spring 13 with its topmost smallest convolution 14 disposed outermost, the said convolution being preferably normally of a diameter slightly less than the diameter of the reduced portion of the shaft within the groove 12. When so formed, the spring 13 may only be applied over the end of the shaft 10 by forcing it thereon to expand the convolution 14 of the spring, which may be accomplished by a downward pressure exerted by the fingers of the operator's hand, or by a tool which may comprise a flanged cylinder 15 having a lower opened end 16 and a flanged contact portion 17 adapted to be pressed or struck to force the convolution 14 over the end 10 of the shaft, which is of larger diameter than the relieved grooved portion 12 thereof. This action is continued while the lowermost convolution 18 of the coiled spring engages the floor of the recessed portion 11 of the turntable, until the convolution 14 snaps into place to rest within the groove 12. At such time, the spiral spring will have become flattened to the form shown in Fig. 1 and will have an effective thickness preferably insufficient to cause it to project above the surface of the turntable. It, therefore, will not interfere with a record placed on the turntable of the disk type and which is commonly centrally perforated.

In Fig. 6, I show a modified form of the spring of Fig. 4 capable of being used in the same manner, but the topmost turn 14′ of which is provided with an upwardly projecting end which may be engaged by the end of a screw driver or by a pair of pliers, in case it is desired to remove the turntable from the driving shaft after the same has been secured thereto by means of the spring. Ordinarily, however, after the turntable is once applied to the driving shaft, it is unnecessary to remove it therefrom, but if it requires to be removed, the same can be accomplished by employing the end of a screw driver, projecting it below the topmost turn 14, Fig. 4, and lifting upwardly thereon. The turntable, however, may be said to be practically substantially non-removably secured to the shaft when a spring such as that shown in Fig. 4 is employed, and removably secured thereto when a spring such as that illustrated in Fig. 6 is employed.

Having thus described my invention as applied to a phonograph turntable and driving shaft therefor, I am aware that numerous and extensive departures may be made from the embodiment herein illustrated and described, but without departing from the spirit of my invention, and that the same is capable of a wide variety of environments other than that herein illustrated and described, but in which it will have substantially the same mode of operation to accomplish substantially the same or equivalent results.

What I claim is:

1. In a device of the class described, the combination with a shaft, of an element adapted to be carried on the shaft, said shaft having a shoulder at one side of the said element but closely adjacent thereto, a spiral spring adapted to be placed over the shaft and compressed with its base bearing against a face of the element, and a relatively small convolution of the spring being sprung over the said shoulder during application of the spring and adapted to rest against the said shoulder, whereby the said spring is flattened and compressed between the said shoulder and the element to retain the element in position on the shaft, said shoulder being formed by a peripheral groove extending around the shaft, said small convolution adapted to snap into position in the groove, said spring having an outwardly extending projection adapted to be engaged by a hand tool to facilitate removal of a spring from element securing position on the shaft.

2. In a device of the class described, the combination with a shaft having a wheel supporting tapered portion, of a wheel element having a tapered bore adapted to be seated on the tapered portion of the shaft, said shaft comprising a shoulder portion adjacent the smaller end of the tapered portion, a spiral spring having a relatively small end convolution adapted to be sprung over the end of the shaft and the said shoulder and to be compressed against the wheel, the said small convolution during compression of the spring, being moved to adjacent the plane of the largest convolution thereof and by its inherent resiliency adapted to be contracted about the shaft at that side of the shoulder towards the wheel, being retained in compressed condition between the wheel and the shoulder.

3. In a device of the class described, a shaft having a tapered wheel supporting portion with an outward projection and a shoulder thereon, a spiral spring, telescopable over the shaft projection and adapted to be flattened against the wheel, having a relatively small convolution normally of smaller inside diameter than the diameter of the shaft at the shoulder portion, said small convolution being distended during the act of telescoping the spring over the shoulder and contractible about the shaft on the wheel side of the shoulder, said spring exerting pressure against the wheel to retain it on the shaft tapered portion.

4. In a gramaphone mechanism the combination with a disk type turntable, of a hub therefor secured to the bottom side of the turntable and having an axial tapered bore, the turntable having a central depression and perforated at the center thereof in axial alignment with the hub bore, a supporting driving shaft for the turntable having a cooperatively tapered exterior surface adapted, when the shaft is projected through the hub bore, to make a snug fitting engagement with the tapered walls of the bore, said shaft projecting beyond the hub and having an enlarged shoulder formed on its portion exteriorly of the hub, and a spiral spring having a convolution of smaller inside diameter than the diameter of the shoulder adapted to be telescoped over the end of the shaft and to be compressed between the turntable and the shoulder, said spring having one of its larger convolutions seated against the floor of the turntable depression, said spring being retained in such flattened condition as not to project above the plane of the surface of the turntable.

In testimony whereof I hereunto affix my signature this 25th day of February, 1926.

LE BONSIEUR.